3,400,137
3-DESOXY-PREGNENES AND -19-NOR-PREG-NENES AND THEIR PREPARATION

Alexander D. Cross, Mexico City, Mexico, assignor to Syntex Corporation, Panama, Panama, a corporation of Panama
No Drawing. Filed Feb. 17, 1966, Ser. No. 528,099
7 Claims. (Cl. 260—397.4)

This invention relates to novel steroids and to their production.

More particularly, this invention is directed at 3-desoxypregnenes and 3-desoxy-19-norpregnenes having a halomethylene (fused cyclopropyl) group attached to the C-6,7 carbons. Specifically, this invention pertains to steroids represented by the formula:

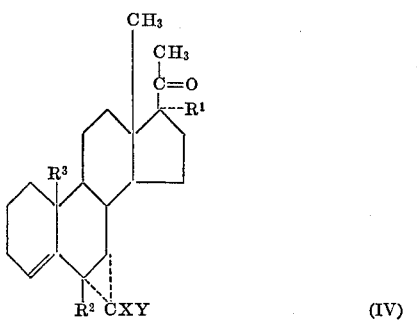

wherein $R^1$ is hydrogen, hydroxy, or a hydrocarbon carboxylic acyloxy group; $R^2$ is hydrogen, methyl, chloro, or fluoro; $R^3$ is hydrogen or methyl; and each of X and Y is chloro or fluoro.

The hydrocarbon carboxylic acyloxy groups of the present invention will contain less than 12 carbon atoms and may be of a straight, branched, cyclic or cyclic-aliphatic chain structure. These may be saturated, unsaturated or aromatic and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate and the like.

These compounds are anti-androgens and are thus useful in the treatment of androgen dependent syndromes and clinical disorders such as acne, benign prostate hypertophy, and hirsutism in females. In addition, these compounds exhibit progestational activity and are useful in the regulation and control of fertility and in the management of various menstrual disorders.

The compounds of this invention depicted above are prepared via a sequence of steps illustrated as follows:

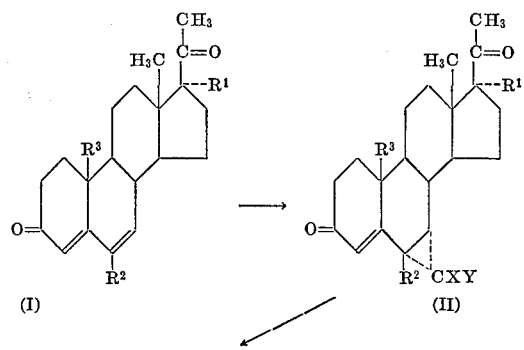

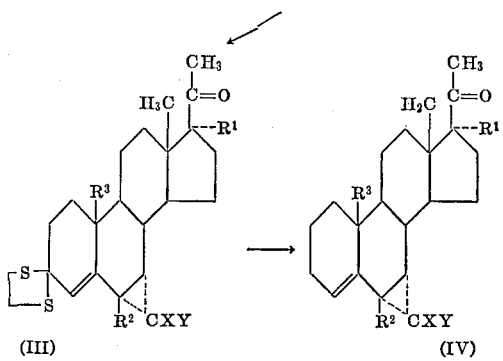

wherein each of $R^1$, $R^2$, $R^3$, X, and Y is as hereinbefore defined.

Referring to the above scheme, the 3-keto-$\Delta^{4,6}$-diene starting steroids (I) containing appropriate substitution as indicated may be obtained from the corresponding 3-keto-$\Delta^4$-enes via conventional procedures such as by treatment with chloranil in the presence of ethyl acetate and acetic acid.

Treatment of the $\Delta^{4,6}$-diene (I) with a molar excess of an alkali or alkaline earth metal salt of a haloacetic acid such as trichloroacetic acid, chlorodifluoroacetic acid, and the like provides the compounds represented by Formula II. The thioketal (III) is prepared upon treatment with ethanedithiol in the presence of p-toluenesulfonic acid catalyst and acetic acid. Subsequent treatment of the thioketal with deactivated Raney nickel catalyst gives the 3-desoxy derivative (IV).

The substituents represented by each of $R^1$, $R^2$, and $R^3$ are present in the $\Delta^4$-ene or $\Delta^{4,6}$-diene starting steroid as indicated. The 6-halo groups may be provided therein by converting the 3-keto-$\Delta^4$-ene to its enol ether such as by treatment with ethylorthoformate and treating the thus prepared enol intermediate with N-chlorosuccinimide or perchloryl fluoride respectively yielding the 3-keto-$\Delta^{4,6}$-diene containing a 6-chloro or fluoro group.

The enol ether may also be treated with N-bromosuccinimide and the resultant 6-bromo compound then dehydrobrominated with calcium oxide to yield the 3-keto-$\Delta^{4,6}$-diene. This upon treatment with chromyl chloride yields the 6,7-chlorohydrin which, when subjected to the action of hydrogen bromide in acetic acid, affords the 3-keto-6-chloro-$\Delta^{4,6}$-diene.

The 17α-hydroxyl group ($R^1$) may be conventionally acylated such as with acetic anhydride, propionic anhydride, and the like in the presence of p-toluenesulfonic acid and acetic acid to give the 17α-acyloxy derivative.

The foregoing description and the following examples serve to illustrate the manner by which this invention may be practiced but they should not be construed as limitations upon the scope hereof.

Example 1

To a stirred and refluxing solution of 1 g. of 6-methyl-17α-acetoxypregna-4,6-diene-3,20-dione in 8 ml. of dimethyl diethyleneglycol ether is added in a dropwise fashion over a two-hour period, a solution of 30 equivalents of sodium chlorodifluoroacetate in 30 ml. of dimethyl diethyleneglycol ether. At the end of the reaction period, which may be followed by the U.V. spectra, the mixture is filtered and evaporated in vacuo to dryness. The residue is added to 10% methanolic potassium hydroxide and this mixture is heated briefly at reflux and poured into ice water. The solid which forms is collected, washed with water, dried and chromatographed on alumina, eluting with methylene chloride, to yield 6β-methyl-6α,7α - difluoromethylene - 17α - acetoxypregn - 4 - ene-3,20-dione.

A mixture of 4.0 g. of 6β-methyl-6α,7α-difluoromethylene-17α-acetoxypregn-4-ene-3,20-dione in 50 ml. of warm acetic acid is treated with 1 ml. of ethanedithiol and a solution of 1.0 g. of p-toluenesulfonic acid monohydrate in 10 ml. of acetic acid. The mixture is kept at room temperature for 17 hours after which a crystalline solid separates. This solid is recrystallized from acetone to give 3,3 - ethylenedithio - 6β - methyl - 6α,7α - difluoromethylene-17α-acetoxypregn-4-en-20-one.

Twenty grams of standard Raney nickel catalyst is refluxed with stirring for 2 hours in 60 ml. of acetone. A solution of 2 g. of 3,3-ethylenedithio-6β-methyl-6α,7α-difluoromethylene-17α-acetoxypregn-4-en-20-one in 40 ml. of acetone and 40 ml. of water is added and the refluxing is continued for 1 hour. The reaction mixture is filtered and the filtrate concentrated in vacuum and extracted with ether. The ethereal layer is successively washed with 100 ml. of cold 1% sodium hydroxide, 100 ml. of 1 N hydrochloric acid, and finally 300 ml. of water, dried over sodium sulfate and evaporated to dryness to give 6β - methyl - 6α,7α - difluoromethylene - 17α - acetoxypregn-4-en-20-one.

In a similar manner, 19-norpregna-4,6-dien-17α-ol-3,20-dione, 17α-acetoxypregna-4,6-diene-3,20-dione, 6-methylpregna-4,6-diene-3,20-dione, 6-fluoropregna-4,6-diene-17α-ol-3,20-dione, 6-fluoro-17α-acetoxypregna-4,6-diene-3,20-dione, 6 - chloro - 17α - acetoxypregna - 4,6 - diene - 3,20-dione, and 6-methyl-17α-hexanoyloxypregna-4,6-diene-3,20-dione are treated as described above to respectively obtain 6α,7α - difluoromethylene - 19 - norpregn - 4 - en-17α - ol - 20 - one, 6α,7α - difluoromethylene - 17α - acetoxypregn - 4 - en - 20 - one, 6β - methyl - 6α,7α - difluoromethylenepregn - 4 - en - 20 - one, 6β - fluoro - 6α,7α-difluoromethylenepregn - 4 - en - 17α - ol - 20 - one, 6β-fluoro - 6α,7α - difluoromethylene - 17α - acetoxypregn-4 - en - 20 - one, 6β - chloro - 6α,7α - difluoromethylene-17α - acetoxypregn - 4 - en - 20 - one, and 6β - methyl-6α,7α - difluoromethylene - 17α - hexanoyloxypregn - 4-en-20-one.

When the procedure outlined in the first paragraph of this example is practiced on the foregoing steroids substituting sodium trichloroacetate and sodium dichlorofluoroacetate for sodium chlorodifluoroacetate, the corresponding 6α,7α-dichloromethylene and 6α,7α-chlorofluoromethylene derivatives are respectively obtained.

A double bond may be introduced at C-6,7 in the starting steroid as follows.

A mixture of 1 g. of 6β-methyl-17α-acetoxypregn-4-en-3,20-dione, 2 g. of chloranil, 15 ml. of ethyl acetate and 5 ml. of acetic acid is refluxed under nitrogen for 96 hours. The mixture is then cooled and washed with cold 10% aqueous sodium hydroxide until the washings were colorless. The organic solution is dried over sodium sulfate and the ethyl acetate removed by evaporation. Upon chromatography of the residue on neutral alumina there is obtained 6-methyl-17α-acetoxypregna-4,6-diene-3,20-dione which may be further purified by recrystallization from acetone:hexane.

Similarly, the other 3-desoxy-6α,7α-difluoromethylene compounds are prepared from the corresponding 3-keto-Δ⁴-enes.

What is claimed is:
1. Steroids of the formula:

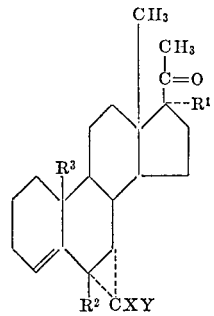

wherein R¹ is hydrogen, hydroxy, or a hydrocarbon carboxylic acyloxy group; R² is hydrogen, methyl, chloro, or fluoro; R³ is hydrogen or methyl; and each of X and Y is chloro or fluoro.

2. Steroids of claim 1 wherein each of R¹, R², and R³ is as therein defined and each of X and Y is fluoro.

3. Steroids of claim 2 wherein R¹ is acetoxy and R³ is methyl.

4. A steroid of claim 3 wherein R² is hydrogen.
5. A steroid of claim 3 wherein R² is methyl.
6. A steroid of claim 3 wherein R² is chloro.
7. A steroid of claim 3 wherein R² is fluoro.

References Cited

UNITED STATES PATENTS 3,338,928   8/1967   Beard et al. _____ 260—397.4

H. A. FRENCH, *Primary Examiner.*